United States Patent
Hoskote Hanumantha Rao et al.

(10) Patent No.: US 12,509,210 B2
(45) Date of Patent: Dec. 30, 2025

(54) AUTOMATIC TIMING BELT DRIVE CARGO LOCK ASSEMBLY

(71) Applicant: GOODRICH CORPORATION, Charlotte, NC (US)

(72) Inventors: Bhargav Hoskote Hanumantha Rao, Bangalore (IN); Sayooj Adavalath Puthiyaveettil, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 397 days.

(21) Appl. No.: 18/189,135

(22) Filed: Mar. 23, 2023

(65) Prior Publication Data
US 2024/0253764 A1 Aug. 1, 2024

(30) Foreign Application Priority Data
Jan. 30, 2023 (IN) .............................. 202341005994

(51) Int. Cl.
*B64C 1/20* (2006.01)
*B64D 9/00* (2006.01)
*B65G 39/02* (2006.01)

(52) U.S. Cl.
CPC ................ *B64C 1/20* (2013.01); *B64D 9/003* (2013.01); *B65G 39/025* (2013.01); *B64D 2009/006* (2013.01); *B65G 2814/0398* (2013.01)

(58) Field of Classification Search
CPC .... B64C 1/20; B64D 9/003; B64D 2009/006; B60P 7/13; B63B 25/28; B63B 25/24; B63B 25/004; B63B 24/22; B63B 2025/285
See application file for complete search history.

(56) References Cited

U.S. PATENT DOCUMENTS

| | | | |
|---|---|---|---|
| 7,926,762 B2 | 4/2011 | Oetken et al. | |
| 8,936,419 B1 | 1/2015 | Islam | |
| 2018/0290724 A1* | 10/2018 | Nowarre | B65G 13/11 |
| 2024/0083305 A1* | 3/2024 | Han | B60N 2/06 |

FOREIGN PATENT DOCUMENTS

CN 105691968 B * 11/2017 ......... B65D 90/0006

* cited by examiner

Primary Examiner — Daniel J Colilla
(74) Attorney, Agent, or Firm — SNELL & WILMER L.L.P.

(57) ABSTRACT

A cargo handling system is disclosed herein. The cargo handling system includes a ball panel for moving and storing cargo and a cargo restraining device disposed within the ball panel. The cargo restraining device includes a first side plate, a motor coupled to the first side plate, an outer pawl, an inner pawl configured to engage the outer pawl, and a belt drive assembly coupled to the motor and to the inner pawl, the belt drive assembly configured to engage the inner pawl to extend and retract the inner pawl.

17 Claims, 10 Drawing Sheets

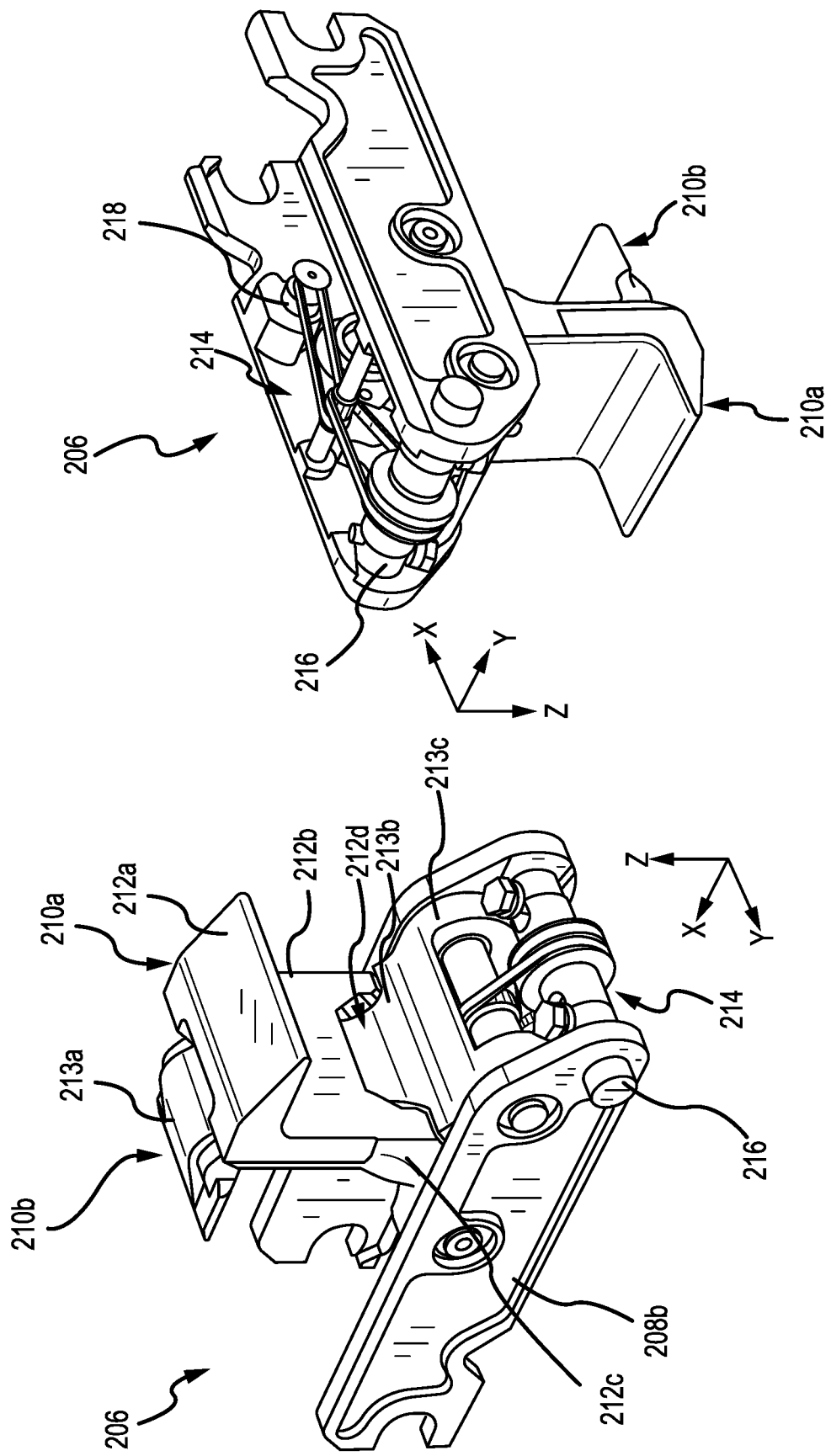

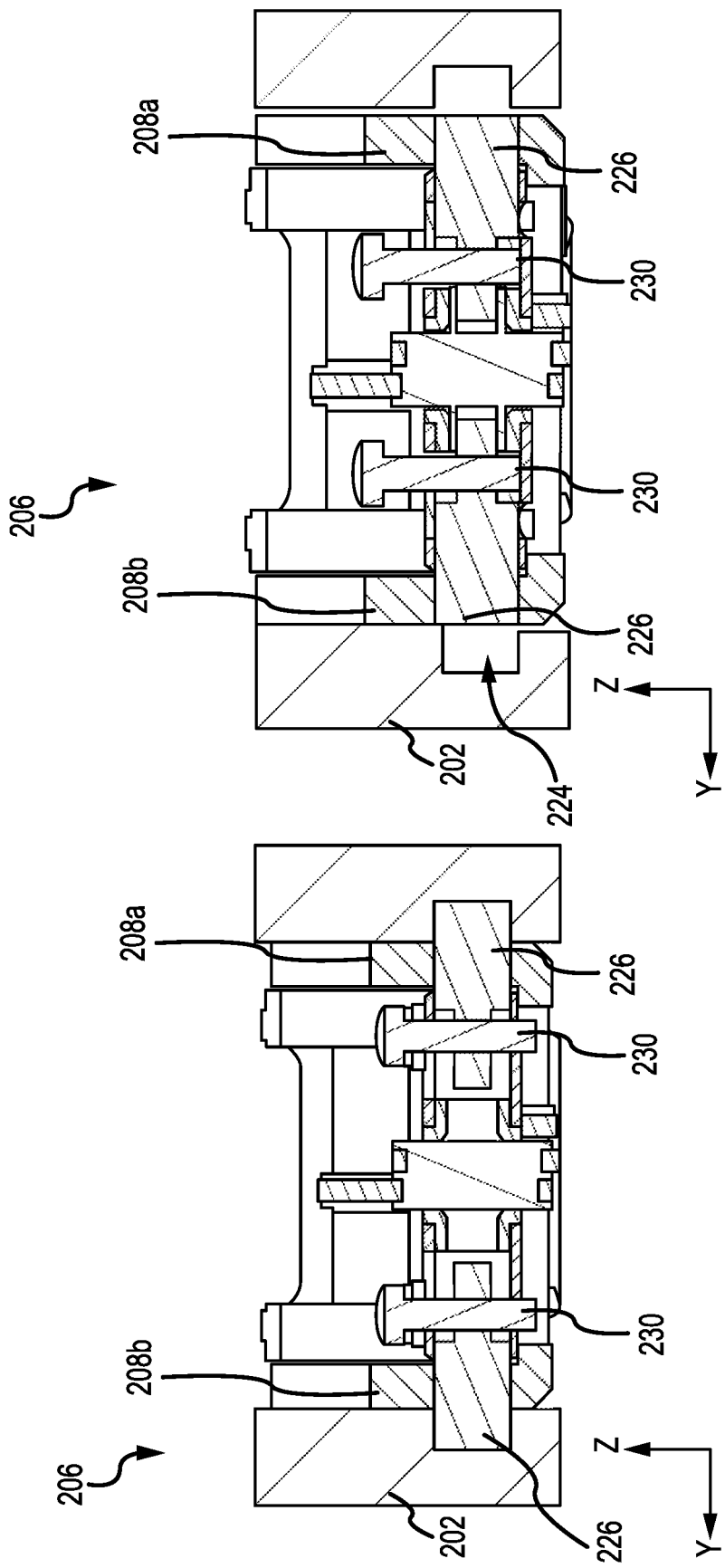

AUTOMATIC TIMING BELT DRIVE CARGO LOCK ASSEMBLY

CROSS-REFERENCE TO RELATED APPLICATIONS

This application claims priority to, and the benefit of, India Patent Application No. 202341005994 (DAS CODE: 3BB2), filed Jan. 30, 2023, and titled "AUTOMATIC TIMING BELT DRIVE CARGO LOCK ASSEMBLY," which is incorporated by reference herein in its entirety for all purposes.

FIELD

The present disclosure generally relates cargo restraining assemblies, and more specifically, to cargo restraining assemblies.

BACKGROUND

Restraint assemblies are used in air cargo compartments with the cargo surface, such as a ball panel, near the cargo loading door of an aircraft. Cargo loaded into the cargo compartment of an aircraft is secured to the aircraft using straps, webbing, or other mechanisms. The final pieces of cargo loaded into the cargo compartment are secured near the cargo loading door. restraint assemblies provide a lateral locking for the cargo near the cargo loading door.

SUMMARY

A cargo handling system is disclosed herein. The cargo handling system including a ball panel for moving and storing cargo and a cargo restraining device disposed within the ball panel. The cargo restraining device including a first side plate, a motor coupled to the first side plate, an outer pawl, an inner pawl configured to engage the outer pawl, and a timing belt drive assembly coupled to the motor and to the inner pawl, the timing belt drive assembly configured to engage the inner pawl to extend and retract the inner pawl.

In various embodiments, the timing belt drive assembly includes a first timing belt pulley coupled to the motor, a second timing belt pulley, an intermediate pulley shaft, a split pulley shaft coupled to the inner pawl, a first timing belt coupled to the first timing belt pulley and the intermediate pulley shaft, a second timing belt coupled to the intermediate pulley shaft and the second timing belt pulley, and a third timing belt coupled to the second timing belt pulley and the split pulley shaft.

In various embodiments, the cargo restraining device further includes a second side plate and a lock pin assembly coupled to the second timing belt pulley, the lock pin assembly configured to extend through the first side plate and the second side plate and engage the ball panel.

In various embodiments, the split pulley shaft includes a first portion coupled to the inner pawl and a second portion coupled to the inner pawl, the second portion coupled to the first portion. In various embodiments, the third timing belt is coupled to the first portion of the split pulley shaft. In various embodiments, the first portion of the split pulley shaft includes a first protrusion to engage a first lower portion of the inner pawl and the second portion of the split pulley shaft includes a second protrusion to engage a second lower portion of the inner pawl.

In various embodiments, the cargo handling system further includes a controller configured to control a rotation of the motor. In various embodiments, the inner pawl extends in response to the motor rotating in a first direction and wherein the outer pawl extends in response to the inner pawl extending.

Also disclosed herein is a cargo restraining device. The cargo restraining device includes a first side plate, a motor coupled to the first side plate, an outer pawl, an inner pawl configured to engage the outer pawl, and a belt drive assembly coupled to the motor and to the inner pawl, the belt drive assembly configured to engage the inner pawl to extend and retract the inner pawl.

In various embodiments, the cargo restraining device further includes a first timing belt pulley coupled to the motor, a second timing belt pulley, an intermediate pulley shaft, a split pulley shaft coupled to the inner pawl, a first timing belt coupled to the first timing belt pulley and the intermediate pulley shaft, a second timing belt coupled to the intermediate pulley shaft and the second timing belt pulley, and a third timing belt coupled to the second timing belt pulley and the split pulley shaft.

In various embodiments, the cargo restraining device further includes a second side plate and a lock pin assembly coupled to the second timing belt pulley, the lock pin assembly configured to extend through the first side plate and the second side plate. In various embodiments, the first timing belt pulley has a first diameter, the intermediate pulley shaft has a second diameter, and the split pulley shaft has a third diameter, wherein the first diameter is equal to the second diameter and the third diameter is greater than the first diameter.

In various embodiments, the split pulley shaft includes a first portion coupled to the inner pawl and a second portion coupled to the inner pawl, the second portion coupled to the first portion. In various embodiments, the third timing belt is coupled to the first portion of the split pulley shaft. In various embodiments, the first portion of the split pulley shaft includes a first protrusion to engage a first lower portion of the inner pawl and the second portion of the split pulley shaft includes a second protrusion to engage a second lower portion of the inner pawl. In various embodiments, the inner pawl extends in response to the motor rotating in a first direction and wherein the outer pawl extends in response to the inner pawl extending.

Also disclosed herein is a system including a motor, a timing belt drive assembly coupled to the motor, a first pawl, a second pawl coupled to the timing belt drive assembly, the second pawl engaging the first pawl causing the first pawl to extend in response to the second pawl extending, a processor, and a memory operatively coupled to the processor. The memory includes instructions stored thereon that, when executed by the processor, cause the processor to send a first current to the motor to rotate in a first direction to extend the second pawl and stop the first current to the motor in response to the motor rotating a first number of rotations, locking the first pawl and the second pawl in an extended position.

In various embodiments, the instructions, when executed by the processor, further cause the processor to receive a first instruction indicating the first number of rotations and send the first current in response to receiving the first instruction. In various embodiments, the instructions, when executed by the processor, further cause the processor to send a second current that is opposite the first current to the motor to rotate in a second direction that is opposite the first direction to retract the second pawl and stop the second current to the motor in response to the motor rotating the first number of rotations. In various embodiments, the system further includes a speed controller in communication with the processor, wherein the instructions, when executed by the processor, further cause the processor to send a second instruction to the speed controller, the speed controller sending the first current to the in response to receiving the second instruction.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 3A, 3B, 3C, and 3D illustrate a cargo restraining device, in accordance with various embodiments.

FIGS. 6A and 6B illustrate locking pins for securing a cargo restraining device to a cargo handling system, in accordance with various embodiments.

DETAILED DESCRIPTION

Figure 1:
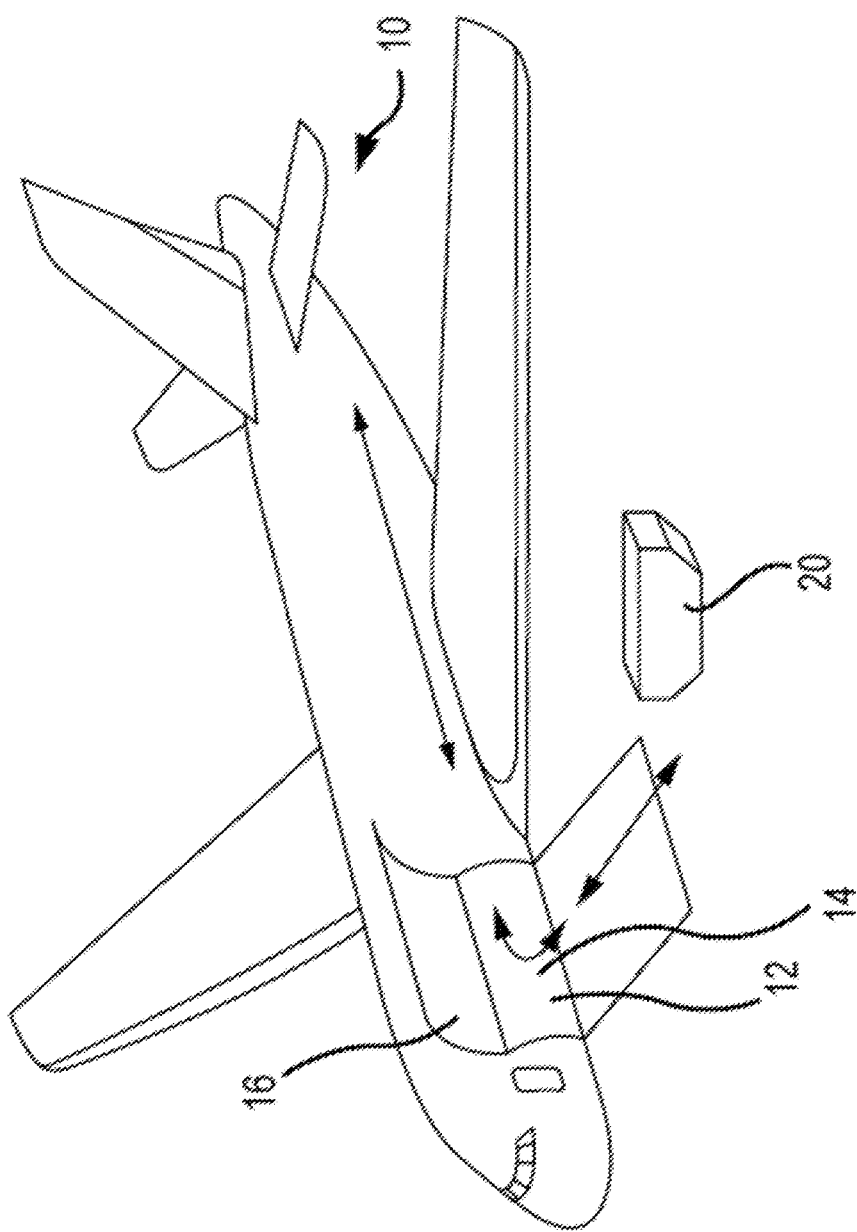
FIG. 1 illustrates a schematic of an aircraft being loaded with cargo, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Disclosed herein is a restraint assembly for use in a cargo compartment, such as in an aircraft. The restraint assembly disclosed herein includes an inner pawl and an outer pawl that, in various embodiments, improves and simplifies existing designs. Inner pawl and outer pawl, in various embodiments, are in contact with each other to achieve synchronous working so that extending one (e.g., the inner pawl) extends the other (e.g., the outer pawl). In various embodiments, the restraint assembly may be automated using a motor and a timing belt drive assembly to drive the inner pawl. In various embodiments, controlling the rotation of the inner pawl controls the rotation of the outer pawl. In various embodiments, the timing belt drive system disclosed herein may fit within existing lock space so that the restraint assembly may fit in existing space with little to no modification to the space.

In various embodiments, the restraint assembly includes a first side plate and a second side plate with the motor mounted on the first side plate. In various embodiments, the motor torque is transferred to a first timing belt pulley. In various embodiments, the first timing belt pulley is connected to an intermediate pulley shaft by a first timing belt. In various embodiments, the intermediate pulley shaft is coupled to the first side plate and the second side plate. In various embodiments, torque is transferred from the intermediate pulley shaft to a second timing belt pulley by a second timing belt. In various embodiments, the second timing belt pulley is assembled inside of a locking pin housing assembly. In various embodiments, the locking pin housing assembly secures the restraint assembly to the cargo compartment (e.g., a ball panel). In various embodiments, torque is transferred from the second timing belt pulley to a split pulley shaft by a third timing belt. In various embodiments, the split pulley shaft includes a first split pulley shaft and a second split pulley shaft that are assembled through a spline arrangement. In various embodiments, the split pulley shaft is assembled into the inner pawl and coupled to the first side plate and the second side plate.

The restraint assembly disclosed herein may reduce operation time by allowing all restraint assemblies within a cargo compartment to be remotely extended and/or retracted. In various embodiments, the status of each restraint assembly (e.g., extended or retracted) may be known without visual inspection. In various embodiments, the restraint assembly may be motorized and accurately controlled using a servo motor.

Referring now to FIG. 1, in accordance with various embodiments, a perspective view of an aircraft 10 is illustrated. Aircraft 10 includes a cargo deck 12 located within a cargo compartment 14. Aircraft 10 may comprise a cargo load door 16 located, for example, at one side of a fuselage structure of aircraft 10. A unit load device (ULD) 20, in the form of a container or pallet, for example, may be loaded through cargo load door 16 and onto cargo deck 12 of aircraft 10 or, conversely, unloaded from cargo deck 12 of aircraft 10. A "ULD", as used herein, includes a container, pallet, or other cargo of any size, shape, configuration, and/or type. In general, ULDs are available in various sizes and capacities, and are typically standardized in dimension and shape. Once loaded with items destined for shipment, ULD 20 is transferred to aircraft 10 and then loaded onto aircraft 10 through cargo load door 16 using a conveyor ramp, scissor lift or the like. As illustrated, ULD 20 is loaded laterally (e.g., the negative y-direction) into cargo compartment 14. Once inside aircraft 10, ULD 20 may be moved longitudinally (e.g., the x-direction) cargo compartment 14 to a final stowed position. Straps may be used to secure ULD 20 in the final stowed position to minimize, or prevent, movement of ULD 20 during transport. Multiple ULDs may be brought on-board aircraft 10, with each ULD 20 being placed in a respective stowed position on cargo deck 12. One or more final ULDs 20 may be loaded laterally into cargo compartment 14 but not moved longitudinally within cargo compartment 14. After aircraft 10 has reached its destination, each ULD 20 is unloaded from aircraft 10 in similar fashion, but in reverse sequence to the loading procedure. To facilitate movement of ULD 20 along the cargo deck 12, aircraft 10 may include a cargo handling system as described herein in accordance with various embodiments.

Figures 2A, 2B:
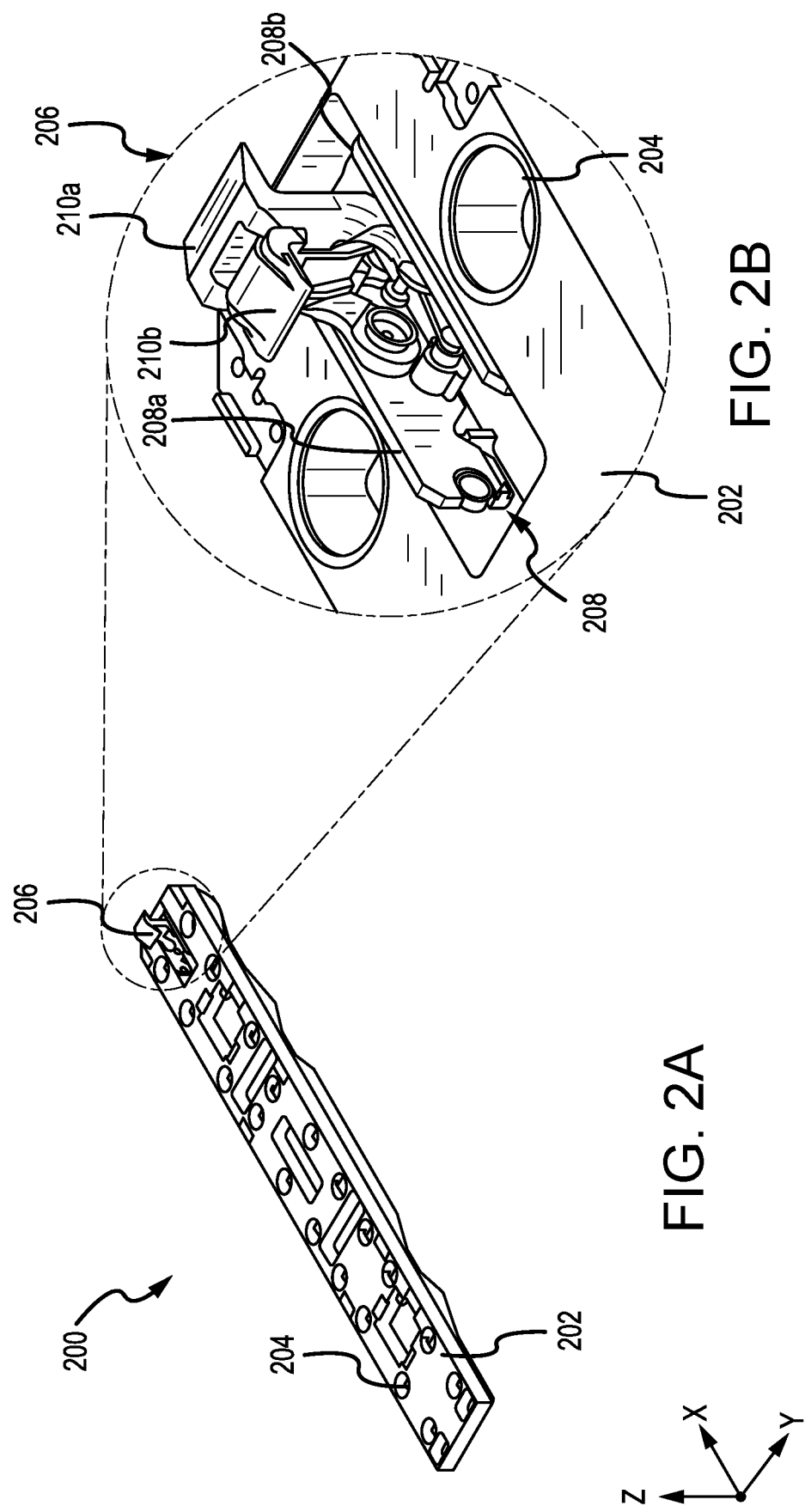
FIGS. 2A, 2B, 2C, and 2D illustrate a cargo handling system including a cargo restraining device, in accordance with various embodiments.
Figures 2C, 2D:
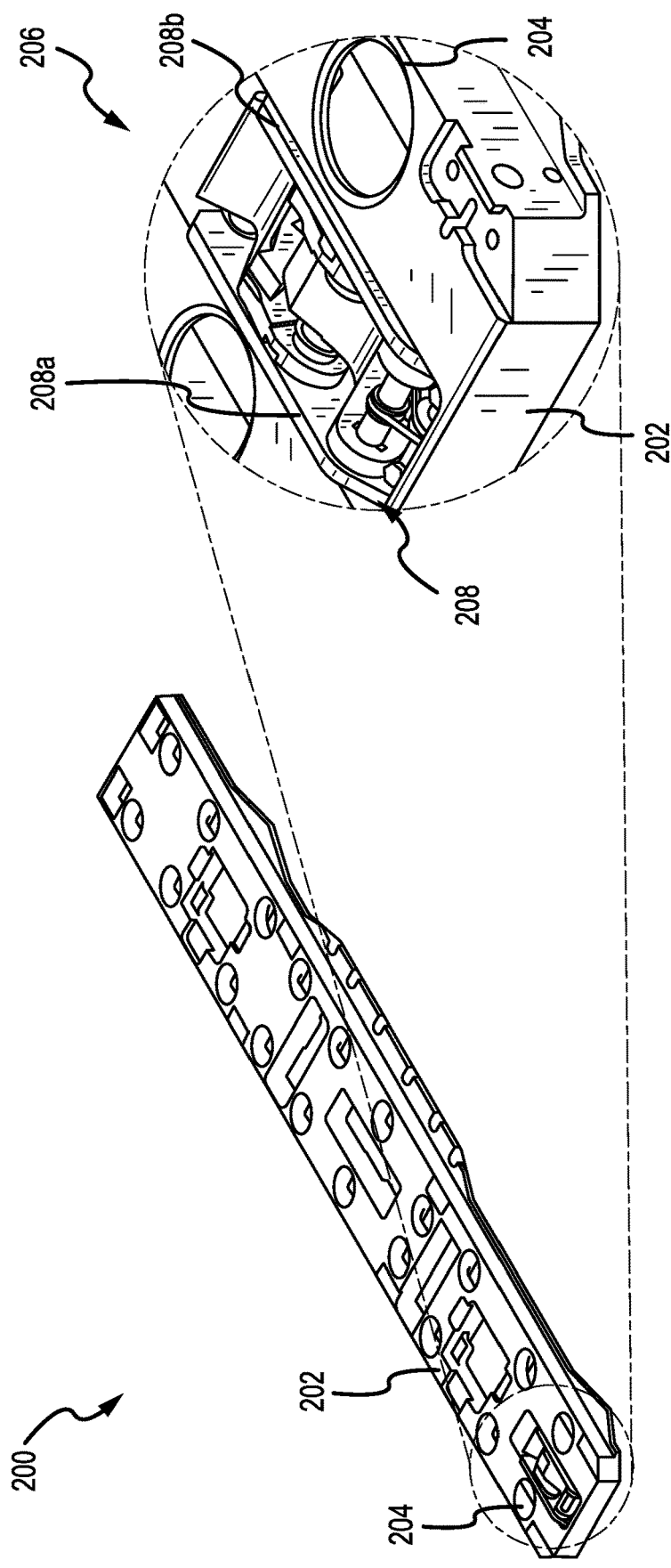

Referring now to FIGS. 2A-2D, a cargo handling system 200 including a cargo restraining device 206 is illustrated, in accordance with various embodiments. FIG. 2A is a perspective view of cargo handling system 200 and FIG. 2B is a perspective view of cargo restraining device 206 in an extended position. FIG. 2C is a perspective view of cargo handling system 200 and FIG. 2D is a perspective view of cargo restraining device 206 in a retracted position. Cargo handling system 200 includes a ball panel 202 having a plurality of omni-directional rollers 204 and one or more cargo restraining devices 206. Ball panel 202 may be located in cargo compartment 14, such as within the opening created by cargo load door 16. Ball panel 202 is configured to load/unload the cargo (e.g., ULD 20) laterally within aircraft 10 (e.g., the negative y-direction) and move the cargo (e.g., ULD 20) longitudinally (e.g., the x-direction) within cargo compartment 14. Omni-directional roller 204 allows the cargo to move both laterally and longitudinally. In various embodiments, cargo handling system 200 may further include one or more power drive units (PDUs) configured to move the cargo along ball panel 202. For example, one or more PDUs may be configured to move the cargo laterally along ball panel 202 and one or more different PDUs may be configured to move the cargo longitudinally over ball panel 202.

Cargo restraining device 206 may include a base 208, also referred to as a frame, having a first side plate 208a and a second side plate 208b. First side plate 208a and second side plate 208b may be referred to collectively as base 208. Cargo restraining device 206 further includes an outer pawl 210a and an inner pawl 210b. Cargo restraining device 206 is configured to retract (i.e., fold inner pawl 210b and outer pawl 210a into base 208, between first and second side plate 208a, 208b) and extend (i.e., deploy inner pawl 210b and outer pawl 210a from base 208). When in a retracted state, as illustrated in FIGS. 2C and 2D, cargo restraining device 206 is below (i.e., in the negative z direction) the surface of ball panel 202, and more specifically, omni-directional roller 204 allowing cargo (e.g., ULD 20) to move across ball panel 202. When in an extended state, as illustrated in FIGS. 2A and 2B, cargo restraining device 206 is configured to restrain the cargo from moving in a specific direction. (e.g., the y-direction). In various embodiments, outer pawl 210a prevents a first cargo (e.g., a first ULD) from moving in the negative x-direction and inner pawl 210b prevents a second cargo (e.g., a second ULD) from moving in the positive x-direction. In various embodiments, cargo restraining device 206 is used as a backup restraining device to the straps that are used to restrain the cargo. In various embodiments, cargo restraining device 206 may be deployed near cargo load door 16 to prevent cargo (e.g., ULD 20) from moving toward cargo load door 16 in the event that the cargo shifts during transport.

Figure 3D:
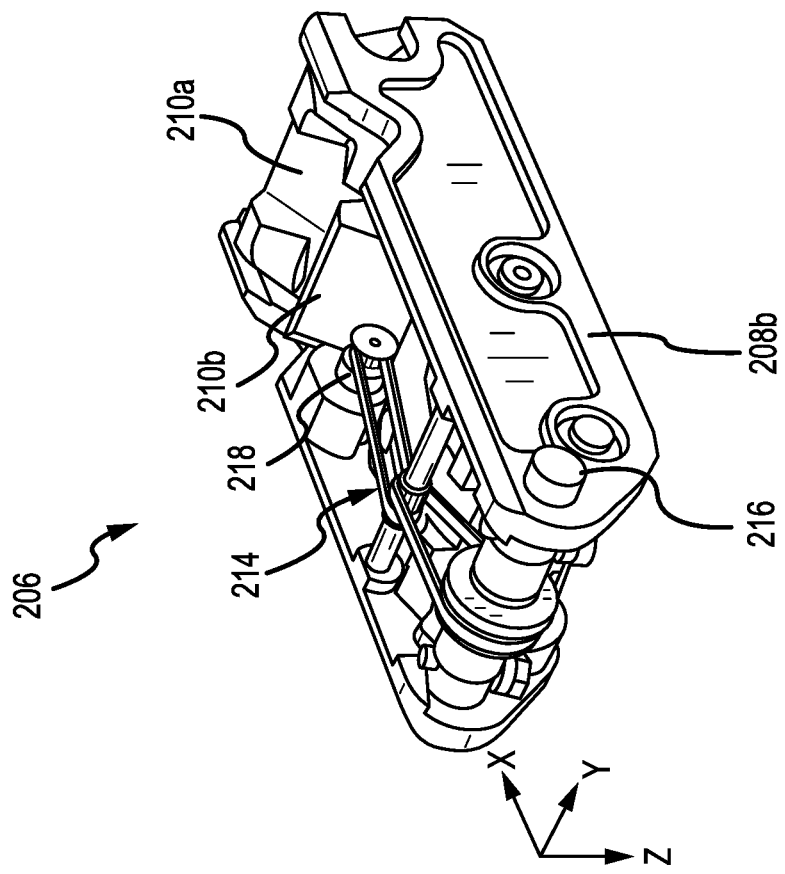
Figure 3C:
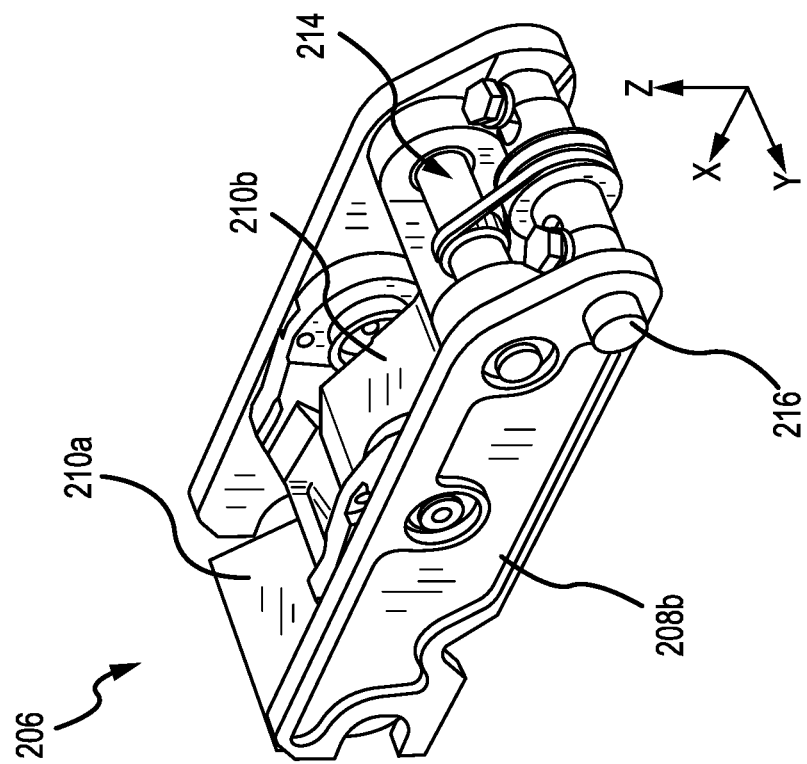

Referring now to FIGS. 3A-3D, illustrated are perspective views of cargo restraining device 206, in accordance with various embodiments. FIGS. 3A and 3B illustrate a perspective top view and a perspective bottom view, respectively, of cargo restraining device 206 in an extend, or deployed, position (e.g., outer pawl 210a and inner pawl 210b extended perpendicular to first side plate 208a and second side plate 208b). FIGS. 3C and 3D illustrate a perspective top view and a perspective bottom view, respectively, of cargo restraining device 206 in a retracted, or disengaged, position (e.g., outer pawl 210a and inner pawl 210b folded into base 208 (i.e., between first side plate 208a and second side plate 208b)).

Outer pawl 210a includes an outer horizontal portion 212a, an outer vertical portion 212b, and outer base legs 212c. Outer horizontal portion 212a extends orthogonally from outer vertical portion 212b creating an inverted L-shape. outer horizontal portion 212a is configured to engage a first cargo (e.g., ULD 20, sidewall of cargo, etc.) to prevent the first cargo from moving. Outer base legs 212c extend from outer vertical portion 212b forming a space 212d.

Inner pawl 210b includes an inner horizontal portion 213a, an inner vertical portion 213b, and an inner base portion 213c. Inner horizontal portion 213a extends orthogonally from inner vertical portion 213b creating an inverted L-shape. Inner horizontal portion 213a extends in a direction opposite outer horizontal portion 212a and is configured to engage a second cargo (e.g., ULD 20, sidewall of cargo, etc.) to prevent or tend to prevent the second cargo from moving. When in the extended position, inner pawl 210b extends through space 212d of outer pawl 210a allowing outer pawl 210a and inner pawl 210b remain in constant contact with each other. This contact allows both outer pawl 210a and inner pawl 210b to move synchronously when extending or retracting.

Cargo restraining device 206 further includes a timing belt drive assembly 214, a locking pin assembly 216, and a motor 218. Motor 218 is coupled to first side plate 208a. Outer pawl 210a, inner pawl 210b, timing belt drive assembly 214, and locking pin assembly 216 are coupled to first side plate 208a and second side plate 208b. Timing belt drive assembly 214 is configured to directly raise (e.g., extend) and lower (e.g., retract) inner pawl 210b and inner pawl 210b causes outer pawl 210a to raise and lower.

Figure 4:
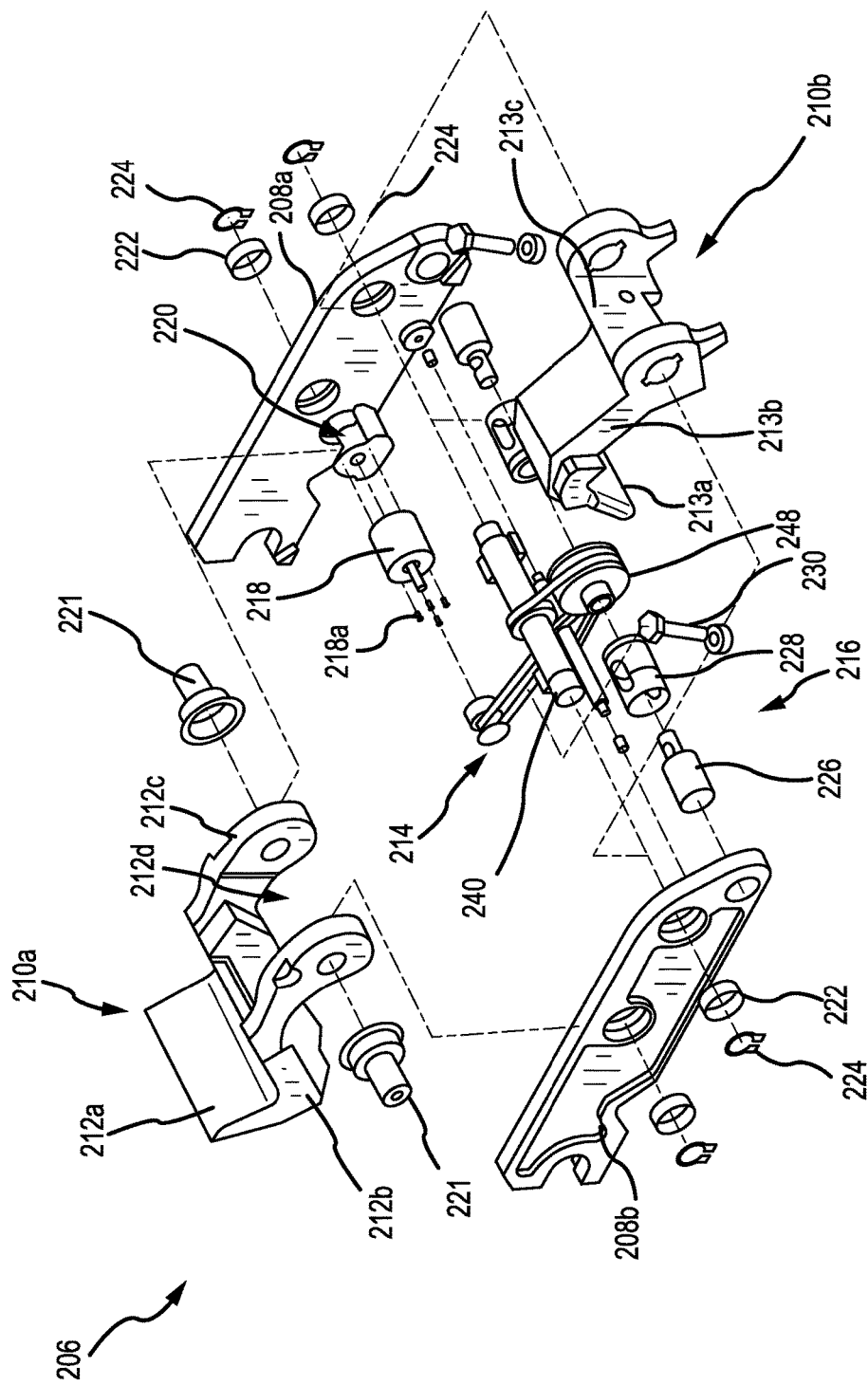
FIG. 4 illustrates an exploded view of components of a cargo restraining device, in accordance with various embodiments.

Referring now to FIG. 4, illustrated is an exploded perspective view of cargo restraining device 206 and its various components, in accordance with various embodiments. Cargo restraining device 206 includes first side plate 208a, second side plate 208b, outer pawl 210a, inner pawl 210b, timing belt drive assembly 214, locking pin assembly 216, and motor 218. Cargo restraining device 206 further includes a motor housing 220, a plurality of outer pawl shafts 221, a plurality of side plate bushings 222, a plurality of shaft retainer rings 224. Motor housing 220 houses motor 218 and secures motor 218 to first side plate 208a. One or more screws 218a may be used to secure motor 218 to motor housing 220. Locking pin assembly 216 includes one or more lock pins 226, one or more lock pin housings 228, and one or more locking screws 230. With momentary reference to FIGS. 5A-5D, belt drive assembly 214 includes a first split pulley shaft 240, a second split pulley shaft 242, an intermediate pulley shaft 244, a first timing belt pulley 246, a second timing belt pulley 248, a first timing belt 250, a second timing belt 252, a third timing belt 254, and intermediate pulley shaft bushings 256.

Returning to FIG. 4, each lock pin housing 228 is coupled to second timing belt pulley 248 at one end and receives a lock pin 226 through an opening in the opposite end. Locking screw 230 is configured to pass through a first opening in a sidewall of lock pin housing 228, through lock pin 226, and through a second opening in the sidewall of lock pin housing 228. Lock pin 226 may slide, or translate, back and forth within lock pin housing 228 with locking screw 230 prevent lock pin 226 from sliding out of lock pin housing 228. Furthermore, locking screw 230 may secure lock pin 226 in either a retracted, or unlocked, position (e.g., into lock pin housing 228) or an extended, or locked, position (e.g., extending out from lock pin housing 228). Lock pin 226 is configured to extend through either first or second side plate 208a, 208b and into ball panel 202 to secure cargo restraining device 206 to ball panel 202. Timing belt drive assembly 214 secures inner pawl 210b to both first and second side plates 208a, 208b, as discussed below. Outer pawl shafts 221 are coupled to outer pawl 210a and to both first and second side plates 208a, 208b using side plate bushings 222. In various embodiments, outer pawl shafts 221 are secured to first and second side plates 208a, 208b by shaft retainer rings 224.

Figure 5B:
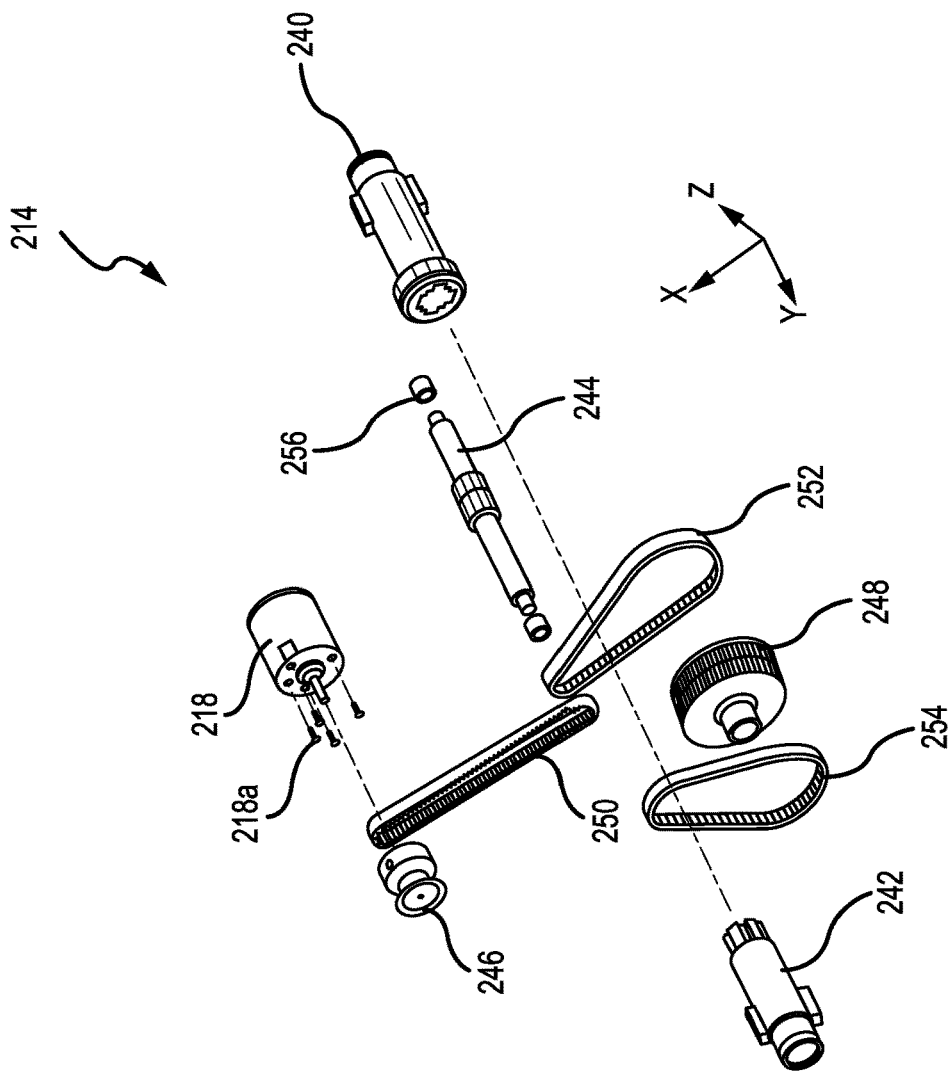
FIGS. 5A, 5B, 5C, and 5D illustrate various views of a belt drive and pulley system used in a cargo restraining device, in accordance with various embodiments.
Figure 5A:
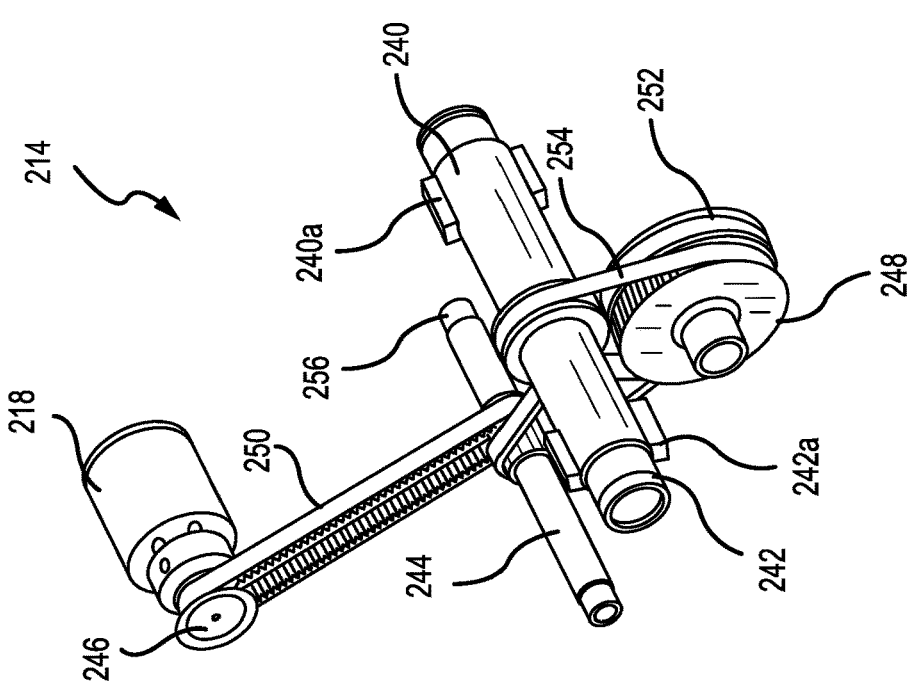
Figure 5C:
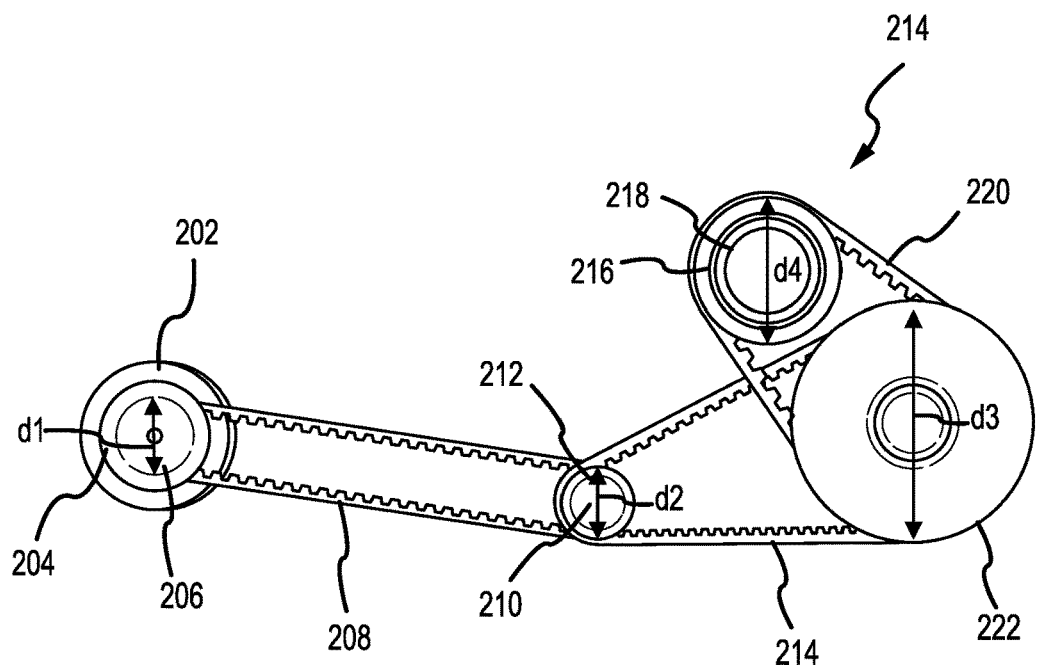
Figure 5D:
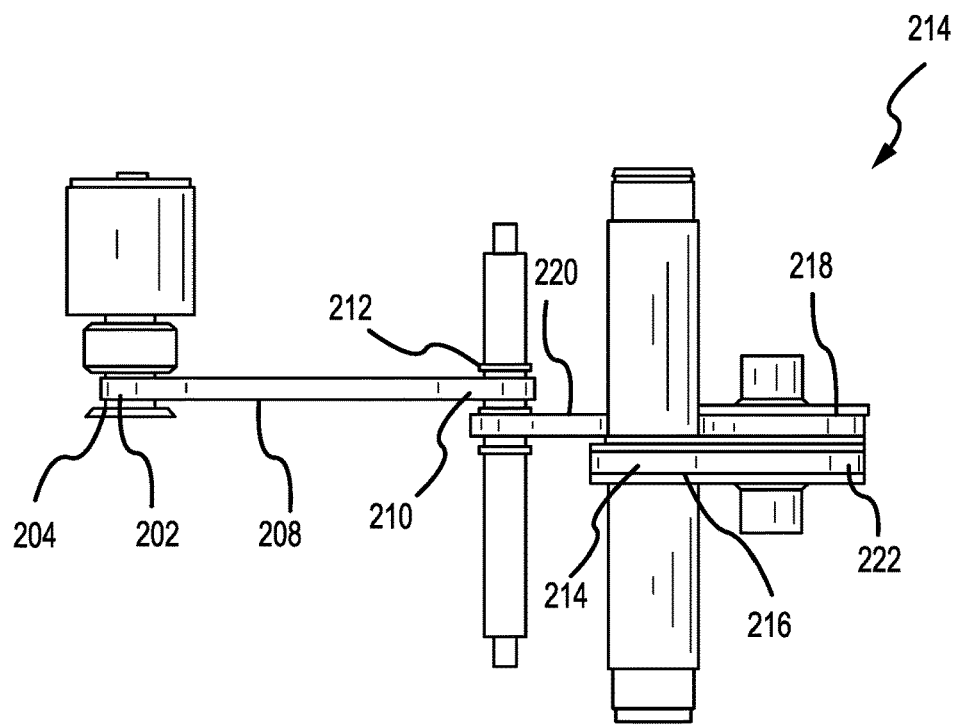

Referring now to FIGS. 5A-5D and with continuing reference to FIG. 4, belt drive assembly 214 is illustrated, in accordance with various embodiments. FIG. 5A illustrates a perspective view of belt drive assembly 214, FIG. 5B illustrates an exploded perspective view of belt drive assembly 214 and its components, FIG. 5C illustrates a side view of belt drive assembly 214, and FIG. 5D illustrates a top view of belt drive assembly 214. As discussed above, motor 218 is secured to first side plate 208a of cargo restraining device 206. First timing belt pulley 246 is coupled to motor 218. Intermediate pulley shaft 244 is coupled to both first side plate 208a and second side plate 208b. In various embodiments, intermediate pulley shaft 244 is coupled to first and second side plates 208a, 208b using intermediate pulley shaft bushings 256. Second timing belt pulley 248 is coupled to lock pin housings 228 which are coupled to first and second side plates 208a, 208b. In various embodiments, lock pin housings 228 will allow free rotation of second timing belt pulley 248 with minimum friction. First split pulley shaft 240 and second split pulley shaft 242 are coupled to each other, to first and second side plate 208a, 208b, and through inner pawl 210b, and more specifically, through inner base portion 213c of inner pawl 210b. In various embodiments, an end of second split pulley shaft 242 includes a spline that may be inserted into an end of first split pulley shaft 240 so that both first split pulley shaft 240 and second split pulley shaft 242 rotate together. In various embodiments, first split pulley shaft 240 is coupled to first side plate 208a using side plate bushing 222 and shaft retainer ring 224. First split pulley shaft 240 is secured to first side plate 208a using side plate bushing 222. In various embodiments, shaft retainer ring 224 secures first split pulley shaft 240 to first side plate 208a. Second split pulley shaft 242 is secured to second side plate 208b using side plate bushing 222. In various embodiments, shaft retainer ring 224 secures second split pulley shaft 242 to second side plate 208b.

First timing belt 250 is coupled to first timing belt pulley 246 and intermediate pulley shaft 244 with first timing belt 250 extending around first timing belt pulley 246 and around intermediate pulley shaft 244. In various embodiments, first timing belt 250 includes teeth that are configured to engage with teeth in both first timing belt pulley 246 and intermediate pulley shaft 244. Motor 218 rotates first timing belt pulley 246 causing first timing belt 250 to rotate around first timing belt pulley 246 which causes intermediate pulley shaft 244 to rotate.

Second timing belt 252 is coupled to intermediate pulley shaft 244 and second timing belt pulley 248 with second timing belt 252 extending around intermediate pulley shaft 244 and around second timing belt pulley 248. In various embodiments, second timing belt 252 includes teeth that are configured to engage with teeth in both intermediate pulley shaft 244 and second timing belt pulley 248. Intermediate pulley shaft 244 rotates second timing belt 252, thereby causing second timing belt pulley 248 to rotate.

Third timing belt 254 is coupled to second timing belt pulley 248 and first split pulley shaft 240 with third timing belt 254 extending around second timing belt pulley 248 and around first split pulley shaft 240. In various embodiments, third timing belt 254 includes teeth that are configured to engage with teeth in both second timing belt pulley 248 and first split pulley shaft 240. Second timing belt pulley 248 rotates, causing third timing belt 254 to rotate which causes first split pulley shaft 240 to rotate.

In various embodiments, a torque output by belt drive assembly 214 is greater than a friction between outer pawl 210a and inner pawl 210b. The torque applied to outer pawl 210a and inner pawl 210b by motor 218 may be determined by the diameters of first timing belt pulley 246, intermediate pulley shaft 244, and first split pulley shaft 240 with second timing belt pulley 248 acting as idler. That is, second timing belt pulley 248 is an intermediate torque transfer between second timing belt 252 and third timing belt 254 and has no effect on the torque applied by motor 218. First belt pulley 246 has a first diameter d1, intermediate pulley shaft 244 has a second diameter d2, second timing belt pulley 248 has a third diameter d3, and first split pulley shaft 240 has a fourth diameter d4. In various embodiments, first diameter d1 may be the same as second diameter d2 and fourth diameter d4 may be larger than first diameter d1. Accordingly, this arrangement allows belt drive assembly 214 to output more torque than what is provided by motor 218. In various embodiments, motor 218 may be more or less powerful. In various embodiments, the diameters of first timing belt pulley 246, intermediate pulley shaft 244, and first split pulley shaft 240 may be varied to increase or decrease the torque output by belt drive assembly 214.

First split pulley shaft 240 includes one or more protrusions 240a and second split pulley shaft 242 further includes one or more protrusions 242a. In various embodiments, protrusions 240a and 242a may be rectangular. In various embodiments, protrusions 240a and 242a may be different shapes and or sizes such as triangular, hexagonal, etc. In various embodiments, there may be two protrusions 240a that are offset 180° from each other and two protrusions 242a that are offset 180° from each other. In various embodiments, the two protrusions 240a may be offset by any amount and the two protrusions 242a may be offset by any amount. In various embodiments, there may be one protrusion 240a or more than two protrusions 240a. In various embodiments, there may be one protrusion 242a or more than two protrusions 242a.

The one or more protrusions 240a may interface with inner base portion 213c of inner pawl 210b. More specifically, inner base portion 213c may include a first hole through with first split pulley shaft 240 extends. The first hole may include one or more indents to receive and engage with the one or more protrusions 240a. The one or more protrusions 242a may interface with inner base portion 213c of inner pawl 210b. More specifically, inner base portion 213c may further include a second hole through with second split pulley shaft 242 extends. The second hole may include one or more indents to receive and engage with the one or more protrusions 242a. second split pulley shaft 242 interfaces with first split pulley shaft 240 so that both rotate at the same time in response to third timing belt 254 driving first split pulley shaft 240. Inner pawl 210b extends in response to first split pulley shaft 240 and second split pulley shaft 242 rotating in a first direction. Outer pawl 210a extends in response to inner pawl 210b extending. Inner pawl 210b retracts in response to first split pulley shaft 240 and second split pulley shaft 242 rotating in a second direction opposite the first direction. Outer pawl 210a retracts in response to inner pawl 210b retracting.

Referring now to FIGS. 6A and 6B, cross section views of cargo restraining device 206 are illustrated, in accordance with various embodiments. FIG. 6A illustrates cargo restraining device 206 locked to ball panel 202. lock pin 226 extends from cargo restraining device 206 into ball panel 202 and locking screw 230 extends through lock pin housing 228 and lock pin 226 to secure lock pin 226 in the extended position. This secures cargo restraining device 206 to ball panel 202 during operation. FIG. 6B illustrates cargo restraining device 206 unlocked from ball panel 202. Locking screw 230 is retracted to not extend through a bottom portion of lock pin housing 228 (e.g., the negative z-direction) allowing lock pin 226 to be retracted from ball panel 202. This allows cargo restraining device 206 to be removed from ball panel 202.

Figure 7:
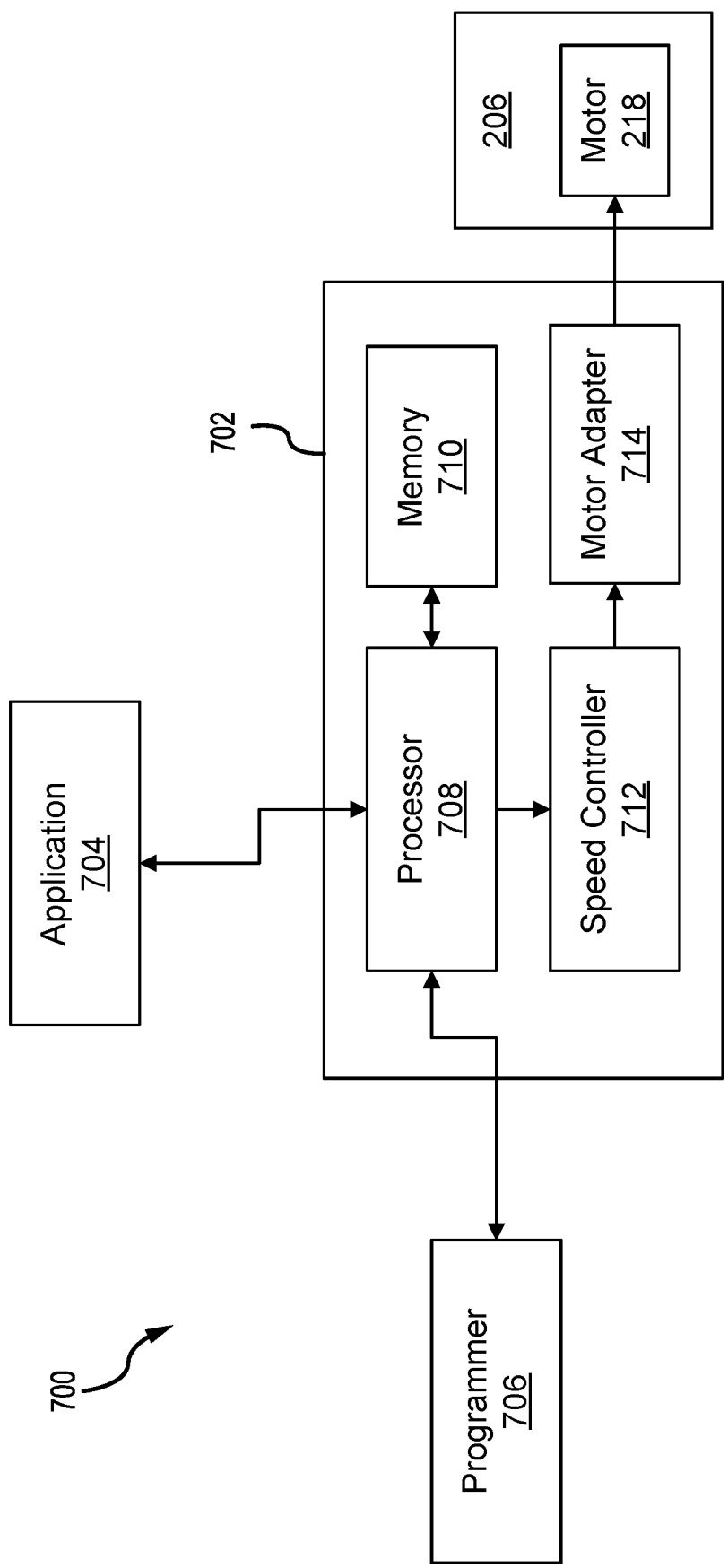
FIG. 7 illustrates a system for controlling a cargo restraining device, in accordance with various embodiments.

Referring now to FIG. 7, a system 700 for controlling cargo restraining device 206, and more specifically, motor 218 is illustrated, in accordance with various embodiments. System 700 includes a controller 702, an application 704, a programming device 706 (e.g., computer, programmer hardware, etc.), and one or more cargo restraining devices 206, each including a motor 218. In various embodiments, application 704 may be used by an operator to control one or more cargo restraining devices 206. In various embodiments, application 704 may be used by another application to control one or more cargo restraining devices 206. Programming device 706 may be used to program and to configure controller 702 to operate each cargo restraining device 206. In various embodiments, each cargo restraining device 206 may be configured differently, such as for example, different sized motors, different gear ratios, among others.

Controller 702 may include a processor 708, a memory 710, a speed controller 712, and a motor adapter 714. Processor 708 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Memory 710 may comprise memory to store data, executable instructions, system program instructions, and/or controller instructions to implement the control logic of controller 702, and more specifically, processor 708.

Speed controller 712 may receive instructions from processor 708 to control the operating speed of motor 218. The operating speed may be controlled by varying the voltage and/or current applied to motor 218. In various embodiments, speed controller 712 may be programed, via processor 708, by programming device 706. In various embodiments, speed controller 712 may be controlled by processor 708.

Motor adapter 714 may be used to control motor 218, in accordance with various embodiments. In various embodiments, motor adapter 714 may include programming and/or encoding used to communicate control information to motor 218. Examples of control information include number of rotations, speed information, or feedback from motor 218, among others.

System program instructions and/or controller instructions may be loaded onto a non-transitory, tangible, computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
   a ball panel for moving and storing cargo; and
   a cargo restraining device disposed within the ball panel, the cargo restraining device including:
   a first side plate;
   a motor coupled to the first side plate;
   an outer pawl;
   an inner pawl configured to engage the outer pawl; and
   a timing belt drive assembly coupled to the motor and to the inner pawl, the timing belt drive assembly configured to engage the inner pawl to extend and retract the inner pawl, wherein the timing belt drive assembly comprises:
   a first timing belt pulley coupled to the motor;
   a second timing belt pulley;
   an intermediate pulley shaft;
   a split pulley shaft coupled to the inner pawl;
   a first timing belt coupled to the first timing belt pulley and the intermediate pulley shaft;
   a second timing belt coupled to the intermediate pulley shaft and the second timing belt pulley; and
   a third timing belt coupled to the second timing belt pulley and the split pulley shaft.

2. The cargo handling system of claim 1, the cargo restraining device further comprising:
   a second side plate; and
   a lock pin assembly coupled to the second timing belt pulley, the lock pin assembly configured to extend through the first side plate and the second side plate and engage the ball panel.

3. The cargo handling system of claim 1, wherein the split pulley shaft comprises:
   a first portion coupled to the inner pawl; and
   a second portion coupled to the inner pawl, the second portion coupled to the first portion.

4. The cargo handling system of claim 3, wherein the third timing belt is coupled to the first portion of the split pulley shaft.

5. The cargo handling system of claim 3, wherein the first portion of the split pulley shaft includes a first protrusion to engage a first lower portion of the inner pawl and the second portion of the split pulley shaft includes a second protrusion to engage a second lower portion of the inner pawl.

6. The cargo handling system of claim 1, further comprising:
   a controller configured to control a rotation of the motor.

7. The cargo handling system of claim 1, wherein the inner pawl extends in response to the motor rotating in a first direction and wherein the outer pawl extends in response to the inner pawl extending.

8. A cargo restraining device, comprising:
   a first side plate;
   a motor coupled to the first side plate;
   an outer pawl;
   an inner pawl configured to engage the outer pawl;
   a belt drive assembly coupled to the motor and to the inner pawl, the belt drive assembly configured to engage the inner pawl to extend and retract the inner pawl;
   a first timing belt pulley coupled to the motor;
   a second timing belt pulley;
   an intermediate pulley shaft;
   a split pulley shaft coupled to the inner pawl;
   a first timing belt coupled to the first timing belt pulley and the intermediate pulley shaft;
   a second timing belt coupled to the intermediate pulley shaft and the second timing belt pulley; and
   a third timing belt coupled to the second timing belt pulley and the split pulley shaft.

9. The cargo restraining device of claim 8, further comprising:
   a second side plate; and
   a lock pin assembly coupled to the second timing belt pulley, the lock pin assembly configured to extend through the first side plate and the second side plate.

10. The cargo restraining device of claim 8, wherein the first timing belt pulley has a first diameter, the intermediate pulley shaft has a second diameter, and the split pulley shaft has a third diameter, wherein the first diameter is equal to the second diameter and the third diameter is greater than the first diameter.

11. The cargo restraining device of claim 8, wherein the split pulley shaft comprises:
    a first portion coupled to the inner pawl; and
    a second portion coupled to the inner pawl, the second portion coupled to the first portion.

12. The cargo restraining device of claim 11, wherein the third timing belt is coupled to the first portion of the split pulley shaft.

13. The cargo restraining device of claim 11, wherein the first portion of the split pulley shaft includes a first protrusion to engage a first lower portion of the inner pawl and the second portion of the split pulley shaft includes a second protrusion to engage a second lower portion of the inner pawl.

14. The cargo restraining device of claim 8, wherein the inner pawl extends in response to the motor rotating in a first direction and wherein the outer pawl extends in response to the inner pawl extending.

15. A system, comprising:
a motor;
a timing belt drive assembly coupled to the motor;
a first pawl;
a second pawl coupled to the timing belt drive assembly, the second pawl engaging the first pawl causing the first pawl to extend in response to the second pawl extending;
a processor; and
a speed controller in communication with the processor; and
a memory operatively coupled to the processor, the memory comprising instructions stored thereon that, when executed by the processor, cause the processor to:
send a first instruction to the speed controller, wherein, responsive to receiving the first instruction, the speed controller is configured to:
send a first current to the motor to rotate in a first direction to extend the second pawl; and
responsive to the motor rotating a first number of rotations, stop the first current to the motor thereby locking the first pawl and the second pawl in an extended position.

16. The system of claim 15, wherein the first instruction indicates the first number of rotations.

17. The system of claim 16, wherein the instructions, when executed by the processor, further cause the processor to:
send a second instruction to the speed controller, wherein, responsive to receiving the second instruction, the speed controller is configured to:
send a second current that is opposite the first current to the motor to rotate in a second direction that is opposite the first direction to retract the second pawl; and
responsive to the motor rotating the first number of rotations, stop the second current to the motor.

* * * * *